(12) United States Patent
Lioy

(10) Patent No.: US 6,775,553 B1
(45) Date of Patent: Aug. 10, 2004

(54) METHOD OF AVOIDING PPP TIME-OUTS DURING IPCP NEGOTIATIONS

(75) Inventor: Marcello Lioy, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/483,351

(22) Filed: Jan. 14, 2000

(51) Int. Cl.$^7$ .............................. H04Q 7/20; H04J 3/24
(52) U.S. Cl. ...................... 455/461; 455/551; 455/435; 370/349; 370/474
(58) Field of Search .............................. 455/435, 557, 455/556, 550, 561, 434, 411, 445, 454, 461, 551; 370/349, 389, 392, 401, 474, 465; 709/217, 219, 222, 225, 227, 237, 250, 245, 249

(56) References Cited

U.S. PATENT DOCUMENTS

| | | | |
|---|---|---|---|
| 5,708,655 A | | 1/1998 | Toth et al. ................... 370/313 |
| 6,061,739 A | * | 5/2000 | Reed ........................... 709/245 |
| 6,111,866 A | * | 8/2000 | Kweon ........................ 370/335 |
| 6,205,490 B1 | * | 3/2001 | Karapetkov ................. 709/249 |
| 6,212,563 B1 | * | 4/2001 | Beser .......................... 709/227 |

FOREIGN PATENT DOCUMENTS

| | | | |
|---|---|---|---|
| WO | 9943133 | 8/1999 | ........... H04L/29/06 |

OTHER PUBLICATIONS

G. McGregor, "The PPP Internet Protocol Control Protocol (IPCP)", XP002123909, May 1992 pps. 1–14.

* cited by examiner

Primary Examiner—Vivian Chin
Assistant Examiner—John J Lee
(74) Attorney, Agent, or Firm—Philip Wadsworth; Charles D. Brown; Howard H. Seo

(57) ABSTRACT

A method for maintaining IPCP address negotiations in a wireless communication network is presented. The method includes a communication device receiving a message requesting an IP address, such as a Config-Request message, from a terminal device, which is coupled to the communication device. The communication device then generates a message requesting an IP address, such as a Config-Request message, and forwards it to a peer (IWF) within the network. The communication device then determines whether it has received an assigned IP address from the IWF in response to the IP address request message. In response to determining that the communication device has not received the assigned IP address from the IWF, the communication device transmits a message with an arbitrary IP address, such as a Configure-Nak message, to the terminal device. The arbitrary IP address contained within the message will be rejected by the communication device, upon receipt of future Configure-Requests containing the arbitrary address. This triggers the terminal device to keep transmitting additional IP address request messages until the communication device has received the assigned IP address.

32 Claims, 4 Drawing Sheets

METHOD OF AVOIDING PPP TIME-OUTS DURING IPCP NEGOTIATIONS

BACKGROUND OF THE INVENTION

1. Field of the Invention

This invention generally relates to the field of wireless communications. More particularly, the present invention relates to a novel method of avoiding time-outs to sustain IPCP address negotiations.

2. Description of Related Art

Recent innovations in wireless communication and computer-related technologies, as well as the unprecedented growth of Internet subscribers, have paved the way for mobile computing. In fact, the popularity of mobile computing has placed greater demands on the current Internet infrastructure to provide mobile users with more support. A crucial part of meeting these demands and providing users with the necessary support is the use of Code Division Multiple Access (CDMA) technology in wireless communication systems.

CDMA is a digital radio-frequency (RF) channelization technique defined in the Telecommunications Industry Association/Electronics Industries Association Interim Standard-95 (TIA/EIA IS-95), entitled "MOBILE STATION-BASE STATION COMPATIBILITY STANDARD FOR DUAL-MODE WIDEBAND SPREAD SPECTRUM CELLULAR SYSTEM", published in July 1993 and herein incorporated by reference. Wireless communication systems employing this technology assign a unique code to communication signals and spread these communication signals across a common (wideband) spread spectrum bandwidth. As long as the receiving apparatus in a CDMA system has the correct code, it can successfully detect and select its communication signal from the other signals concurrently transmitted over the same bandwidth. The use of CDMA produces an increase in system traffic capacity, improves overall call quality and noise reduction, and provides a reliable transport mechanism for data service traffic.

FIG. 1 illustrates the basic elements of such a wireless data communication system 100. Artisans of ordinary skill will readily appreciate that these elements, and their interfaces, may be modified, augmented, or subjected to various standards known in the art, without limiting their scope or function. System 100 allows a mobile terminal equipment, TE2 device 102 (e.g., the terminal equipment such as laptop or palmtop computer) to communicate with an Interworking Function (IWF) 108. System 100 includes a wireless communication device, MT2 device 104 (e.g., wireless telephone), and a Base Station/Mobile Switching Center (BS/MSC) 106. The IWF 108 serves as a gateway between the wireless network and other networks, such as the Public Switched Telephone Network or wireline packet data networks providing Internet-or Intranet-based access. An L interface couples IWF 108 to BS/MSC 106. Often the IWF 108 will be co-located with the BS/MSC 106. The TE2 device 102 is electronically coupled to the MT2 device 104 via the Rm interface. The MT2 device 104 communicates with the BS/MSC 106 via the wireless interface $U_m$. The TE2 device 102 and the MT2 device 104 may be integrated into a single unit (e.g., MT0 device) or may be separated out, as in the case of an installed mobile phone unit in which a laptop is the TE2 device 102 and the transceiver is the MT2 device 104. It is important to note that, as indicated by FIG. 2, the combination of the TE2 device 102 and the MT2 device 104, whether integrated or separate, is generally referred to as a mobile station (MS) 103.

Other support is made possible by applying various well-known protocols to control, manage, or otherwise facilitate different aspects of wireless communications. For example, the life-blood of the Internet infrastructure, the Internet Protocol (IP), has been incorporated in many wireless communication services to accommodate packet-oriented services. The IP protocol specifies the addressing and routing of packets (datagrams) between host computers and is defined in Request For Comment 791 (RFC 791) entitled, "INTERNET PROTOCOL DARPA INTERNET PROGRAM PROTOCOL SPECIFICATION," published September 1981.

The IP protocol is a network layer protocol that encapsulates data into IP packets for transmission. Addressing and routing information is affixed in the header of the packet. IP headers contain 32-bit addresses that identify the sending and receiving hosts. These addresses are used by intermediate routers to select a path through the network for the packet towards its ultimate destination at the intended address. Thus, the IP protocol allows packets originating at any Internet node in the world to be routed to any other Internet node in the world.

Another well-known protocol incorporated in wireless communications systems is the Point-to-Point Protocol (PPP) protocol, which provides, inter alia, Internet access. The PPP protocol is described in detail in Request for Comments 1661 (RFC 1661), entitled "THE POINT-TO-POINT PROTOCOL (PPP)", published July 1994.

Essentially, the PPP protocol specifies a method for transporting multiprotocol datagrams over point-to-point links and contains three main components: a method of encapsulating multi-protocol datagrams; a Link Control Protocol (LCP) for establishing, configuring, and testing a data link connection; and a family of Network Control Protocols (NCPs) for establishing and configuring different network-layer protocols.

In an effort to provide a host of services on wireless communication systems, various standards have been developed to accommodate the wireless data transmission between the TE2 device 102 and the IWF 108. For example, the TIA/EIA IS707.5 standard, entitled "DATA SERVICE OPTIONS FOR WIDEBAND SPREAD SPECTRUM SYSTEMS: PACKET DATA SERVICES," published February 1998, and herein incorporated by reference, defines requirements for support of packet data transmission capability on TIA/EIA IS95 systems and specifies a suite of packet data bearer services.

In particular, the IS-707.5 standard provides certain packet data service modes that may be used to communicate between the TE2 device 102 and IWF 108 via BS/MSC 106. In doing so, IS-707.5 introduces the Network Model, which provides a specific mode of operation. The Network Model represents the situation where a first PPP link is set up between the TE2 device 102 and the MT2 device 104, and a second PPP link, independent of the first, is set up between the MT2 device 104 and the IWF 108. This model makes the MT2 device 104 responsible for unframing any received PPP packets and re-framing them before forwarding them to their final destination as well as providing mobility management and network address management.

FIG. 2 illustrates the protocol stacks in each entity of the IS-707.5 Network Model. At the far left of FIG. 2 is a protocol stack, shown in conventional vertical format, depicting the protocol layers running on the TE2 device 102 (e.g., the mobile terminal, laptop or palmtop computer). The TE2 protocol stack is illustrated as being logically connected to the MT2 device 104 protocol stack over the $R_m$ interface. The MT2 device 104, is illustrated as being logically connected to the BS/MSC 106 protocol stack over the $U_m$ interface. The BS/MSC 106 protocol stack is, in turn, shown as being logically connected to the IWF 108 protocol stack over the L interface.

As an illustration, the protocols depicted in FIG. 2, operate as follows: the PPP layer on the TE2 102 device associated with the Rm interface (i.e., $PPP_R$ 208), encodes packets from the upper layer protocols 204, and the network layer IP protocol 206. The $PPP_R$ layer 208 then transmits the packets across the $R_m$ interface using an applicable protocol, such as, for example, the TIA/EIA 232-F protocol 210, and the packets are received by the TIA/EIA-232-F-compatible port on the MT2 device 104. The TIA/EIA-232-F standard is defined in "INTERFACE BETWEEN DATA TERMINAL EQUIPMENT AND DATA CIRCUIT-TERMINATING EQUIPMENT EMPLOYING SERIAL BINARY DATA INTERCHANGE", published in October 1997 and herein incorporated by reference. It is to be understood that other standards or protocols known to artisans of ordinary skill in the art may be used to define the transmission across the $R_m$ interface. For example, other applicable $R_m$. interface standards include, the "UNIVERSAL SERIAL BUS (USB) SPECIFICATION, Revision 1.1", published in September 1998, and the "BLUETOOTH SPECIFICATION VERSION 1.0A CORE, published in July 1999, both incorporated by reference.

The TIA/EIA 232-F protocol 212 on the MT2 device 104 receives the packets from the TE2 device 102 and passes them to the $PPP_R$ layer 213 of the MT2 device 104. The $PPP_R$ layer 213 unframes the packets encapsulated in the PPP frames and typically, when a data connection is up, layer 213 transfers the packets to the PPP layer associated with the $U_m$. interface (i.e., $PPP_U$ layer 217). $PPP_U$ layer 217 formats the packets in PPP frames for transmission to a $PPP_U$ peer located in the IWF 108. The Radio Link Protocol (RLP) 216 and IS-95 protocol 214, both of which are well known in the art, are used to transmit the packet-encapsulated PPP frames to the BS/MSC 106 over the $U_m$ interface. The RLP protocol 216 is defined in the IS-707.2 standard, entitled "DATA SERVICE OPTIONS FOR WIDEBAND SPREAD SPECTRUM SYSTEMS: RADIO LINK PROTOCOL", published in February 1998 and the IS-95 protocol is defined in the IS-95 standard identified above.

As stated above, the $PPP_R$ protocol 213 transfers the packets to the $PPP_U$ protocol 217 when a data link connection is established. RFC 1661 provides that Link Control Protocol (LCP) packets must be exchanged and negotiated over each PPP link (i.e., $PPP_R$ and $PPP_U$) in order to establish, configure, and test the data link connection.

Once the LCP packets are exchanged, the link options negotiated, and the data link connection established, a network layer connection must be established between the TE2 device 102 and the IWF 108. Such a connection employs protocols 206, 212, 218, 230, that include, for example, the IP protocol. The negotiating, configuring, enabling, and disabling of the IP protocol on both ends of the PPP links is provided by the well-known Internet Protocol Control Protocol (IPCP). IPCP is a part of a family of Network Control Protocols (NCPs) included in the PPP protocol and is described in Request for Comment (RFC) 1332, "THE PPP INTERNET PROTOCOL CONTROL PROTOCOL (IPCP)", published in May 1992.

The IPCP protocol employs the standard PPP Configure-Request, Configure-Ack, and Configure-Nak messages to negotiate various options, including the request and designation of IP addresses. IPCP provides that a requester requesting an IP address, generates a Configure-Request message, which contains a particular address. If the particular IP address is acceptable, a Configuration-Ack message is sent by a peer to the requester. If the particular IP address is not acceptable, then the peer sends a Configure-Nak message containing a suggested IP address. The requester then transmits a new Configure-Request message with the suggested IP address and the peer responds with a Configure-Ack.

It is only possible to assign single IP address across the $PPP_U$ and $PPP_R$ links as there is no mechanism in IPCP to assign more than one address. This means that the IP address that is assigned from the IWF over $PPP_U$, must further be assigned to the TE2 over $PPP_R$. In the Network Model, while IPCP address negotiations can occur separately for both the $R_m$ interface and the $U_m$ interface. As such, the MT2 device 104 must first negotiate an IP address over the $U_m$ interface with the IWF 108 at one end of the $PPP_U$ link, before the address can be assigned to the TE2 device 102 at the other end of the $PPP_R$ link.

The consummation of IPCP address negotiations may be obstructed, however, by operational delays. For example, such delays can occur if the link between the MT2 device 104 and the IWF 108 is slower than the link between the TE2 device 102 and the MT2 device 104. As such, there exists a possibility that IPCP address negotiations are reached faster on the $R_m$ link than on the $U_m$ link. The TE2 device 102 may, therefore, request an IP address from the MT2 device 104, which cannot be granted because the MT2 device 104 has not completed the requisite address negotiations on the $U_m$ link to render an IP address from the IWF 108. Although the TE2 device 102 is capable of waiting for the MT2 device 104 to eventually render an IP address, there are implementation-specific time-outs on the TE2 device 102, which can cause the TE2 device 102 to abort the IP address request, and therefor PPP negotiations altogether.

Another example of operational delays occurs when the IWF 108 has to get the IP address, which will eventually be assigned to the TE2 device 102, from some other entity before it can pass it on to the MT2 device 104. In doing so, it may take several seconds before the MT2 device 104 receives the IP address.

By way of example, it is noted that some applications running on the TE2 device 102 allow the TE2 device 102 to generate Configure-Request messages every 3 seconds for 3 attempts before the TE2 device 102 times out. In such cases, if it takes more than a total of 9 seconds to receive an IP address, the TE2 device 102 aborts the address request. Clearly, either of the two scenarios noted above can generate delays that can lead to the TE2 device 102 to abort prematurely.

Therefore, what is needed is a novel method of avoiding time-outs to sustain IPCP address negotiations.

SUMMARY OF THE INVENTION

The present invention addresses the need identified above by providing a novel method of avoiding time-outs to sustain IPCP negotiations.

Methods consistent with the principles of the present invention as embodied and broadly described herein include a communication device receiving a message requesting an IP address, such as a Config-Request message, from a terminal device which is coupled to the communication device. The communication device then determines whether it has received an assigned IP address from a peer (i.e. IWF) in response to the IP address request message. In response to determining that the communication device has not received the assigned IP address from the IWF, the communication device transmits a message with an arbitrary IP address, such as a Configure-Nak message, to the terminal device. The arbitrary IP address contained within the message will be rejected by the communication device, which triggers the terminal device to keep transmitting additional IP address request messages until the communication device has received the assigned IP address.

BRIEF DESCRIPTION OF THE DRAWINGS

The accompanying drawings, which are incorporated in and constitute a part of this Specification, illustrate an embodiment of the invention and, together with the description, explain the objects, advantages, and principles of the invention. In the drawings.

DETAILED DESCRIPTION OF THE PREFERRED EMBODIMENTS

The following detailed description of the embodiments of the present invention refers to the accompanying drawings that illustrate these. Other embodiments are possible and modifications may be made to the embodiments without departing from the spirit and scope of the invention. Therefore, the following detailed description is not meant to limit the invention. Rather the scope of the invention is defined by the appended claims.

It will be apparent to one of ordinary skill in the art that an embodiment of the present invention, as described below, may be realized in a variety of implementations, including the software, firmware, and hardware of the entities illustrated in the figures (i.e., TE2 device 102, MT2 device 104, BS/MSC 106 and IWF 108). The actual software code or control hardware used to implement the present invention is not limiting of the present invention. Thus, the operation and behavior of the present invention will be described without specific reference to the actual software code or hardware components. Such non-specific references are acceptable because it is clearly understood that a person of ordinary skill in the art would be able to design software and control hardware to implement the embodiment of the present invention based on the description herein.

Figure 1:
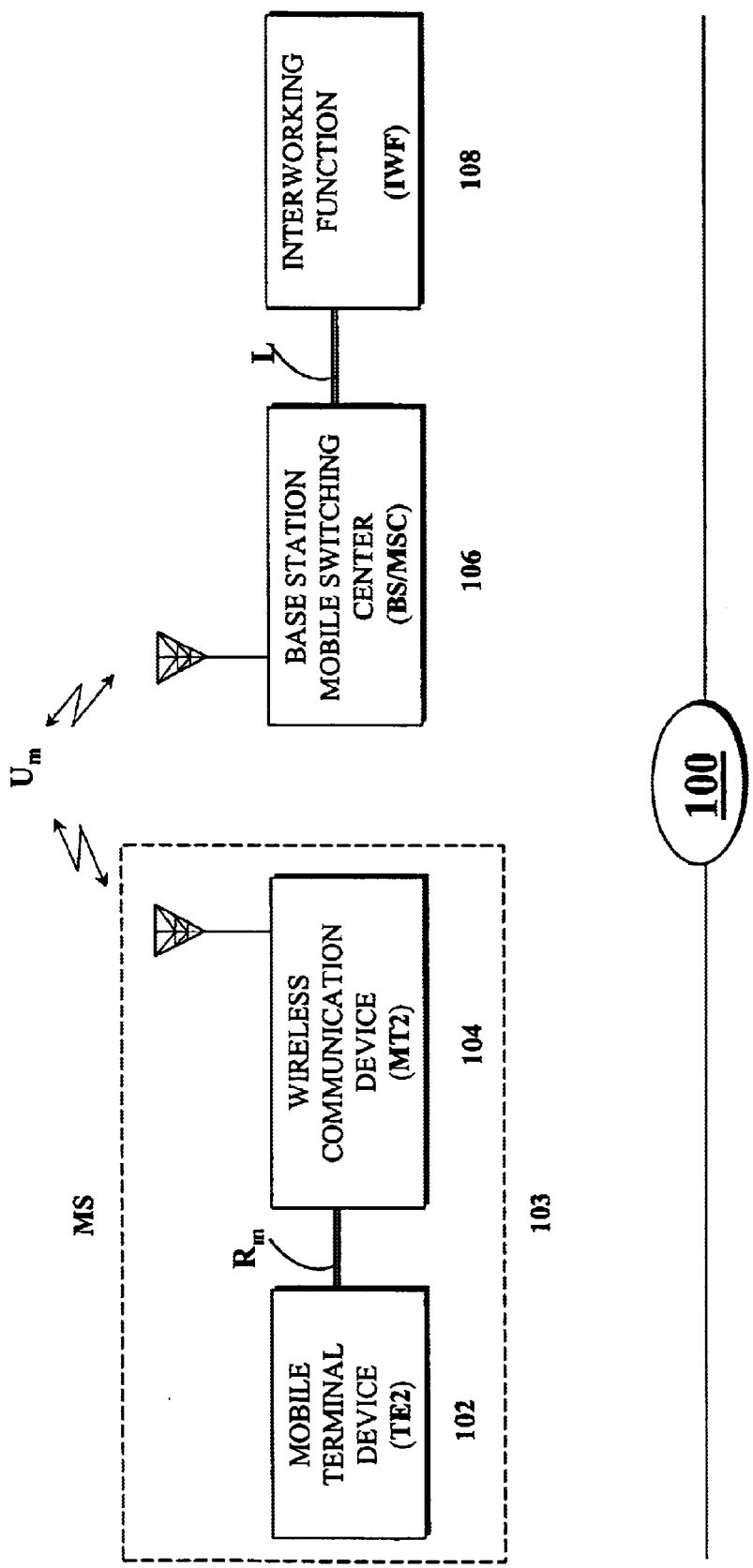
FIG. 1 is a high level block diagram depicting various elements of a wireless communication system.
Figure 2:
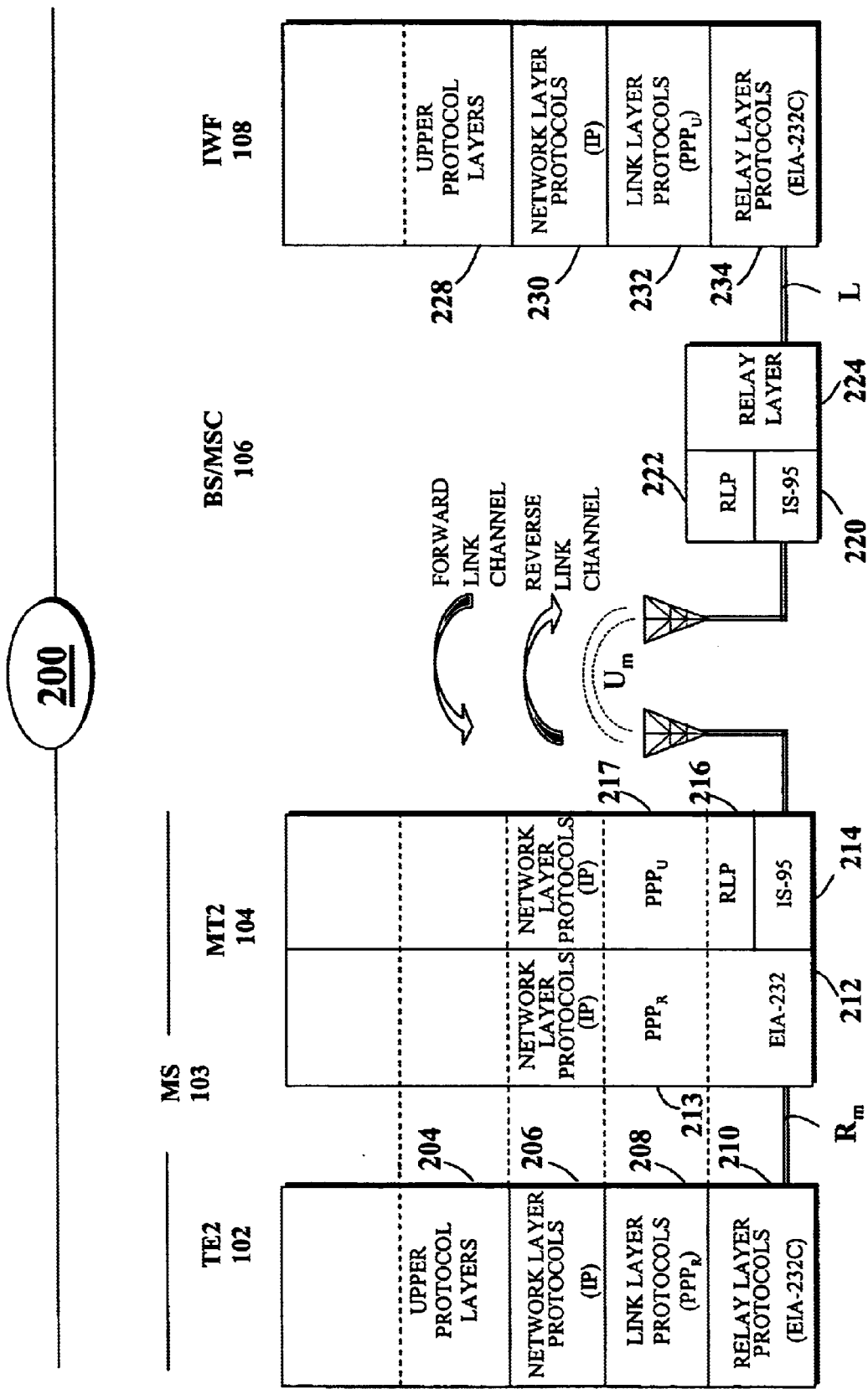
FIG. 2 schematically describes the protocol stacks of a wireless communication system.
Figure 3A:
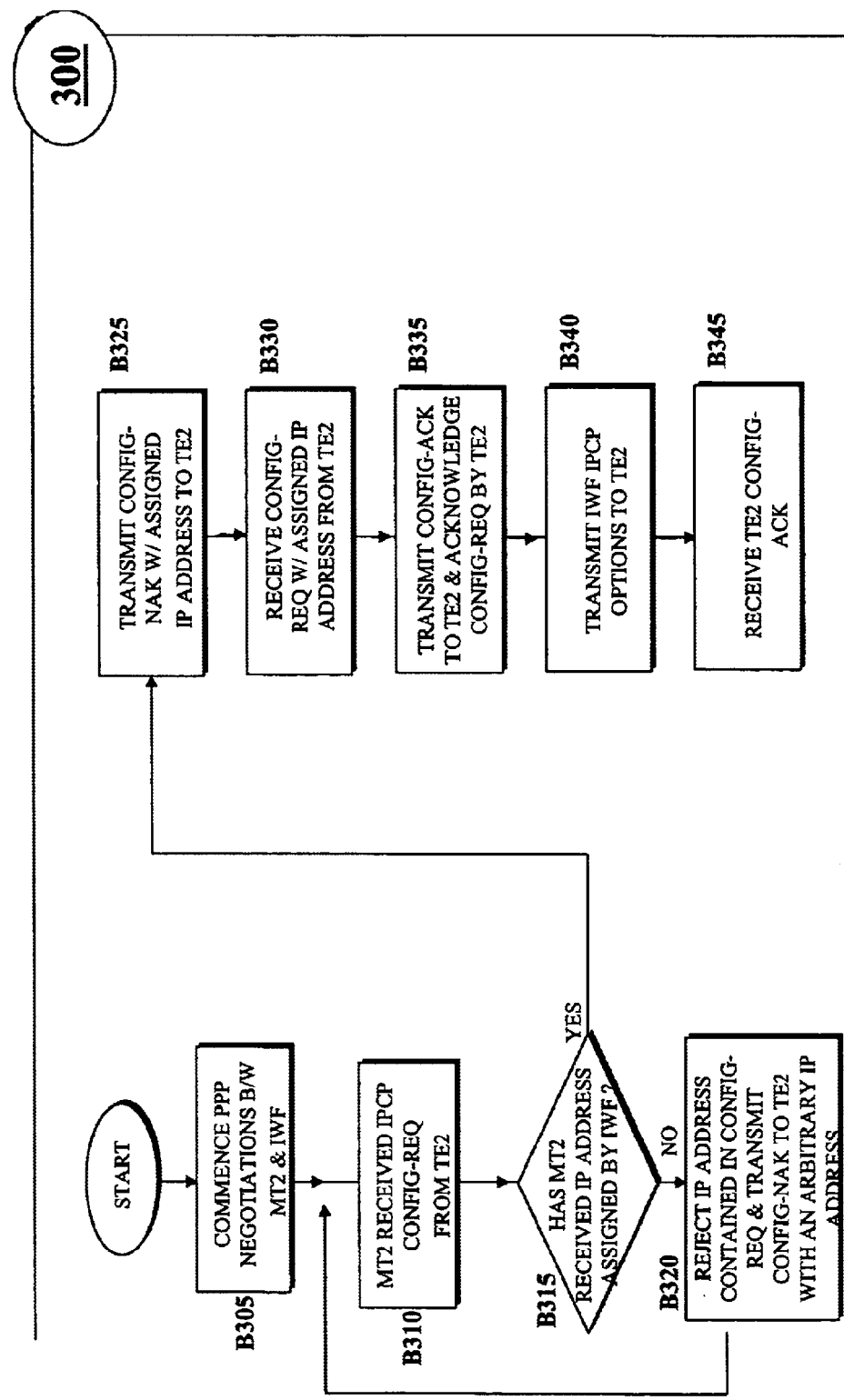
FIG. 3A is a flow-chart diagram describing an embodiment of the invention.
Figure 3B:
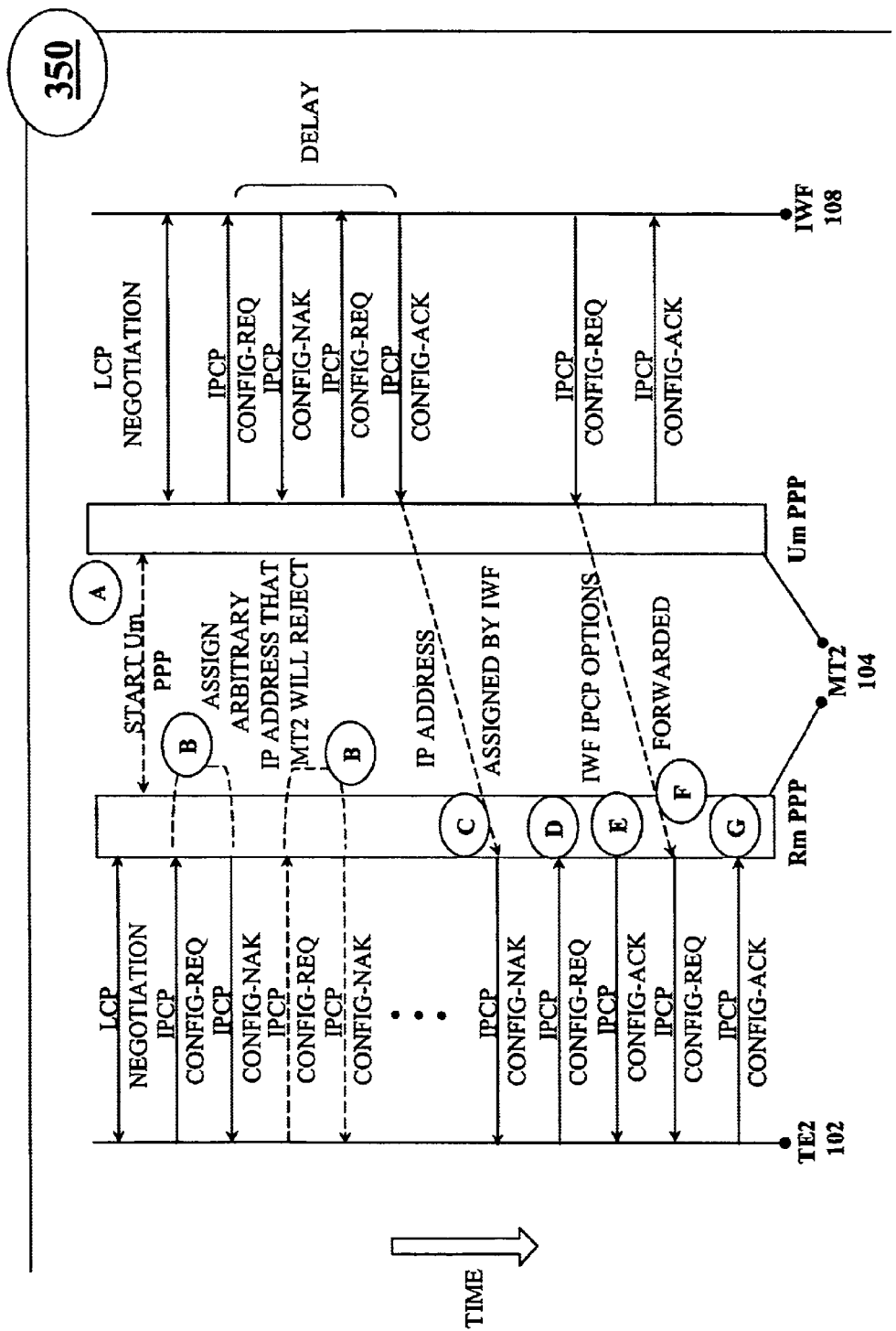
FIG. 3B is a protocol-message flow diagram describing the operation of an embodiment of the invention.

FIG. 3A is a flow-chart diagram depicting an embodiment of the present invention and FIG. 3B is a protocol-message flow diagram describing the operation of an embodiment of the invention. As indicated in FIG. 3A, the MT2 device 104, in block B305, commences PPP negotiations across the $U_m$ interface with the IWF 108. This event is triggered by the start of LCP negotiations on the $R_m$ interface, as depicted in FIG. 3B (see reference numeral A).

In block B310, the MT2 device 104 waits until it has received an IPCP Configure-Request message from the TE2 device 102. Once the MT2 device 104 has received a Configure-Request message from the TE2 device 102, the MT2 device 104 progresses to block B315.

In block B315, the MT2 device 104 determines whether it has received an IP address, assigned by the IWF 108, in response to the Configure-Request message from the TE2 device 102. If it has not, the MT2 device 104 advances to block B320, where it rejects the EP address contained within the Configure-Request message and transmits a Configure-Nak message with an arbitrary IP address. (See, reference numeral B in FIG. 3B). The arbitrary IP address is an address that will be rejected by the MT2 device 104. Upon transmitting the Configure-Nak message with the arbitrary IP address, the MT2 device 104 loops back to block B310 to await another IPCP Configure-Request message from the TE2 device 102, with the arbitrary IP address. Because the arbitrary IP address is not the IP address assigned by the IWF 108, the MT2 device 104 is directed back to block B320 where it, once again, rejects the IP address contained within the Configure-Request message and transmits a Configure-Nak message with an arbitrary IP address. The arbitrary address may be the same address as the previous iteration or may be a different address. The loop created by the series of blocks B310-B315-B320 iterate until the MT2 device 104 determines that it has received an IWF 108-assigned IP address. By engaging the TE2 device 102 and triggering it to generate Configure-Req messages, the MT2 device 104 prevents the TE2 device 102 from timing out, thereby sustaining the IPCP address negotiations. It would also be possible to introduce a delay into the loop which will reduce the number of messages exchanged between the MT2 device 104 and the TE2 device 102.

Returning back to block B315, if the MT2 device 104 determines that it has received an IWF 108-assigned IP address, the MT2 device 104 progresses to B325 where it transmits a Configure-Nak message containing the assigned IP address to the TE2 device 102. (See, reference numeral C). The MT2 device 104 then receives, in block B330, a Configure-Request message with the assigned IP address from the TE2 device 102. (See, reference numeral D).

The MT2 device 104 advances to block B335, where it transmits a Config-Ack message to the TE2 device 102, to acknowledge the Configure-Request message from the TE2 device 102. (See, reference numeral E). In block B340, the MT2 device 104 then transmits the EPCP options negotiated over the $U_m$ link with the IWF 108 to the TE2 device 102. (See, reference numeral F). The MT2 device 104 then receives, in block B345, a Config-Ack message from the TE2 device 104, acknowledging the options in use by the IWF 108-assigned IP address. (See, reference numeral G). It is noted that the processes in blocks B340 and B345 are not strictly required, as the MT2 device 104 could send any arbitrary IPCP values to the TE2 device 102 since all packets are being framed and unframed through the MT2 device 104.

Thus, this embodiment is capable of avoiding implementation-specific time-outs by supplying the TE2 device 102 with Configure-Nak messages, which contain arbitrary IP addresses that will be rejected by the MT2 device 104. The Configure-Nak messages trigger the TE2 device 102 into generating Configure-Request messages. This interplay continues until the MT2 device 104 receives the IWF 108-assigned IP address and forwards this IP address to the TE2 device 102 in a Configure-Nak message. In this manner, the TE2 device 102 is precluded from prematurely aborting due to implementation-specific timeouts and PPP negotiations are sustained.

The foregoing description of preferred embodiments of the present invention provides illustration and description, but is not intended to be exhaustive or to limit the invention to the precise form disclosed. Modifications and variations are possible consistent with the above teachings or may be acquired from practice of the invention. Accordingly, the scope of the invention is defined by the claims and their equivalents.

What is claimed:

1. A method for maintaining IP address negotiations in a wireless communication network, said method comprising:
   receiving, in a communication device, a message requesting an IP address from a terminal device, said terminal device coupled to said communication device;
   generating, in said communication device, a message requesting an IP address from said communication network in response to said IP address request message; and
   determining whether said communication device has received an assigned IP address from said communication network, wherein, in response to determining that said communication device has not received said assigned IP address, said communication device repeatedly transmits a message with an arbitrary IP address to said terminal device to trigger said terminal device to respond by transmitting IP address request messages with said arbitrary IP address and said communication device rejects said arbitrary IP address in said IP address request messages until said communication device has received said assigned IP address from said communication network.

2. The method of claim 1, wherein said generating includes, forwarding said IP address request message from said communication device to an interworking function included in said communication network, and
   negotiating with said interworking function to secure said assigned address based on said IP address request message.

3. The method of claim 2, wherein said determining includes ascertaining whether said interworking function has provided said assigned IP address in response to said IP address negotiations.

4. The method of claim 3, wherein, in response to determining that said communication device has received said assigned IP address, said communication device transmits a message with said assigned IP address to said terminal device.

5. The method of claim 4, wherein, in response to transmitting said assigned IP address message to said terminal device, said communication device receives an IP address request message with said assigned IP address from said terminal device.

6. The method of claim 5, wherein, in response to receiving said IP address request message with said assigned IP address from said terminal device, said communication device transmits a message acknowledging said IP address request message to said terminal device.

7. The method of claim 6, wherein, in response to transmitting a message acknowledging said IP address request message to said terminal device, said communication device transmits a message with configuration options from said interworking function.

8. The method of claim 7, wherein, in response to transmitting said message with configuration options from said interworking function, said communication device receives a message acknowledging receipt of said assigned IP address by said terminal device to said interworking function.

9. The method of claim 8, wherein said IP address request message is an IPCP Configure-Request message.

10. The method of claim 9, said arbitrary IP address message is an IPCP Configure-Nak message containing one of a plurality of arbitrary IP addresses that said communication device will reject.

11. The method of claim 10, wherein said ascertaining whether said interworking function has assigned an IP address in response to said IP address request message is determined by identifying whether said communication device has received an IPCP Configure-Ack message containing an IP address from said interworking function.

12. The method of claim 11, wherein said assigned IP address message is an IPCP Configure-Nak message containing said assigned IP address provided by said interworking function.

13. The method of claim 12, wherein said IP address request message with said assigned IP address is an IPCP Configure-Request message containing said assigned IP address.

14. The method of claim 13, wherein said message acknowledging said IP address request message with said assigned IP address is an IPCP Configure-Ack message.

15. The method of claim 14, wherein said message acknowledging said receipt of said assigned IP address to said interworking function is an IPCP Configure-Ack message.

16. The method of claim 15, further including introducing a delay of a predetermined duration to reduce the number of times said communication device repeatedly transmits said arbitrary IP address message and the number of times said terminal device responds with said IP address request messages containing said arbitrary IP address.

17. A mechanism for maintaining IP address negotiations in a wireless communication network, said mechanism comprising:
   a terminal device; and
   a communication device coupled to said terminal device, said communication device receiving an IP address request message from said terminal device and, in response, said communication device transmitting an IP address request message to said communication network;
   wherein, said communication device determines whether it has received an assigned IP address from said communication network, and
   wherein, in response to determining that said communication device has not received said assigned IP address, said communication device repeatedly transmits a message with an arbitrary IP address to said terminal device to trigger said terminal device to respond by transmitting IP address request messages with said arbitrary IP address and said communication device rejects said arbitrary IP address in said IP address request messages until said communication device has received said assigned IP address from said communication network.

18. The mechanism of claim 17, wherein said wireless communication network an interworking function and said communication device transmitting an IP address request message to said communication network includes,
   forwarding said IP address request message from said communication device to said interworking function, and
   negotiating with said interworking function to secure said assigned address based on said IP address request message.

19. The mechanism of claim 18, wherein said communication device determines whether it has received an assigned IP address from said communication network by ascertaining whether said interworking function has provided said assigned IP address in response to said IP address negotiations.

20. The mechanism of claim 19, wherein, in response to determining that said communication device has received said assigned IP address, said communication device transmits a message with said assigned IP address to said terminal device.

21. The mechanism of claim 20, wherein, in response to transmitting said assigned IP address message to said terminal device, said communication device receives an IP address request message with said assigned IP address from said terminal device.

22. The mechanism of claim 21, wherein, in response to receiving said IP address request message with said assigned IP address from said terminal device, said communication device transmits a message acknowledging said IP address request message to said terminal device.

23. The mechanism of claim 22, wherein, in response to transmitting a message acknowledging said IP address request message to said terminal device, said communication device transmits a message with configuration options from said interworking function.

24. The mechanism of claim 23, wherein, in response to transmitting said message with configuration options from said interworking function, said communication device receives a message acknowledging receipt of said assigned IP address by said terminal device to said interworking function.

25. The mechanism of claim 24, wherein said IP address request message is an IPCP Configure-Request message.

26. A The mechanism of claim 25, said arbitrary IP address message is an IPCP Configure-Nak message containing one of a plurality of arbitrary IP addresses that said communication device will reject.

27. The mechanism of claim 26, wherein said ascertaining whether said interworking function has assigned an IP address in response to said IP address request message is determined by identifying whether said communication device has received an IPCP Configure-Ack message containing an IP address from said interworking function.

28. A The mechanism of claim 27, wherein said assigned IP address message is an IPCP Configure-Nak message containing said assigned IP address provided by said interworking function.

29. A The mechanism of claim 28, wherein said IP address request message with said assigned IP address is an IPCP Configure-Request message containing said assigned IP address.

30. The mechanism of claim 29, wherein said message acknowledging said IP address request message with said assigned IP address is an IPCP Configure-Ack message.

31. The mechanism of claim 30, wherein said message acknowledging said receipt of said assigned IP address to said interworking function is an IPCP Configure-Ack message.

32. The mechanism of claim 31, wherein a delay of a predetermined duration is introduced to reduce the number of times said communication device repeatedly transmits said arbitrary IP address message and the number of times said terminal device responds with said IP address request messages containing said arbitrary IP address.

* * * * *